United States Patent
Herlihy

(10) Patent No.: US 9,321,853 B2
(45) Date of Patent: Apr. 26, 2016

(54) PHOTOINITIATOR COMPOSITION

(75) Inventor: Shaun Lawrence Herlihy, Kent (GB)

(73) Assignee: Sun Chemical Corporation, Parsippany, NJ (US)

(*) Notice: Subject to any disclaimer, the term of this patent is extended or adjusted under 35 U.S.C. 154(b) by 506 days.

(21) Appl. No.: 13/394,700

(22) PCT Filed: Sep. 1, 2010

(86) PCT No.: PCT/GB2010/001657
§ 371 (c)(1),
(2), (4) Date: Mar. 7, 2012

(87) PCT Pub. No.: WO2011/030089
PCT Pub. Date: Mar. 17, 2011

(65) Prior Publication Data
US 2012/0171434 A1 Jul. 5, 2012

Related U.S. Application Data

(60) Provisional application No. 61/240,349, filed on Sep. 8, 2009.

(51) Int. Cl.
*C09D 7/00* (2006.01)
*C08F 2/50* (2006.01)
*C09D 11/101* (2014.01)

(52) U.S. Cl.
CPC ... *C08F 2/50* (2013.01); *C09D 7/00* (2013.01); *C09D 11/101* (2013.01); *Y10T 428/24802* (2015.01)

(58) Field of Classification Search
CPC ......... C09D 11/101; C09D 7/00; B41M 1/00; B41M 3/14
USPC ................. 428/195.1; 430/302, 306; 101/483
See application file for complete search history.

(56) References Cited

U.S. PATENT DOCUMENTS

| | | |
|---|---|---|
| 2007/0139502 A1 | 6/2007 | Held et al. |
| 2007/0229612 A1 | 10/2007 | Oyanagi et al. |
| 2009/0181182 A1 | 7/2009 | Sloan |

FOREIGN PATENT DOCUMENTS

| | | | | |
|---|---|---|---|---|
| EP | 1925609 A1 * | 5/2008 | | |
| EP | 0253101 | 4/2009 | | |
| EP | 2053101 A1 * | 4/2009 | ............. | C09D 11/10 |
| GB | 2454579 | 5/2009 | | |
| WO | WO 00/04421 | 1/2000 | | |
| WO | WO 2004026978 A1 * | 4/2004 | | |
| WO | WO 2004/056581 | 7/2004 | | |
| WO | WO 2006111707 A1 * | 10/2006 | ............... | B41J 11/00 |

OTHER PUBLICATIONS

Bentens et al. "New polymeric photoinitiators for graphic arts", RadTech Europe 2005 Conference & Exhibition, 2005.*
Bertens et al. "New Polymeric Photoinitiators for Graphics Arts", RadTech Europe 2005 Conference & Exhibition, 2005.

* cited by examiner

*Primary Examiner* — Chanceity Robinson
(74) *Attorney, Agent, or Firm* — Charles C. Achkar; Ostrolenk Faber LLP

(57) ABSTRACT

A photoinitiator composition comprising a combination of aminoalkyl phenone, thioxanthone and multifunctional amino benzoate synergist for use in printing inks and coatings that are curable using UV radiation, particularly from LED lamps.

15 Claims, No Drawings

PHOTOINITIATOR COMPOSITION

This application is a 35 U.S.C. §371 National Stage Entry of International Application No. PCT/GB2010/001657 Sep. 1, 2010, which claims priority to U.S. Provisional Application No. 61/240,349 filed Sep. 8, 2009, both of which hereby are incorporated by reference in their entirety for all purposes as if fully set forth herein.

FIELD OF THE INVENTION

The present invention relates to photoinitiator compositions for use in inks and coatings that are curable using ultraviolet (UV) radiation and, in particular, UV radiation from light emitting diode (LED) light sources.

BACKGROUND

UV LED curing has been the subject of significant development over the past few years because of the advantages of low temperature operation and extremely long life in comparison with conventional medium pressure mercury arc curing lamps. UV LED lamps are advantageous because of the inherently small size of LED units and their ability to be easily engineered into commercial printing systems.

US 2002/0149660 (Arthur L Cleary and Joseph A Lahut) entitled "Apparatus and method for setting radiation curable ink" describes the equipment and method for curing inkjet ink using UV LED lamps. U.S. Pat. No. 7,175,712 (Con-Trol-Cure Inc.) entitled "Light emitting apparatus and method for curing inks, coatings and adhesives." describes staggered rows of UV LED chips arranged in such a way as to allow UV curing of inks and coatings on a moving web. US 2005/0104946 (Con-Trol-Cure Inc.) entitled "Inkjet UV curing" describes the way in which UV LEDs can be mounted and used to cure UV inkjet inks or least partially polymerize them and also the need to use an inert gas environment to improve the cure by suppressing oxygen inhibition. No details of the formulations that are particularly suitable for curing using LED lamps are disclosed in those documents. US 2005/0128274 (Konica Minolta Holdings Inc.) entitled "Inkjet Printer" describes fully integrated inkjet printing units fitted with UV LED curing that avoids problems of heat from conventional curing lamps and is also smaller and cheaper to build. The application also describes UV inks as either free radical or cationic in nature but does not provide details of any of the photoinitiator types necessary to cure such a composition. While Mercury arc lamps typically have a polychromatic emission spectrum, emitting light in all regions of the UV-visible spectrum of from 200 to 450 nm, UV LED lamps typically have only a single emission band at a UV wavelength towards the longer end of the spectrum, for example 365-420 nm, typically about 395 nm. It is widely accepted that short wavelength UV light is responsible particularly for "surface cure" in inks and coatings, whereas long wavelength light has much higher penetration and is responsible for much of the "through curing". The reduced total UV output associated with UV LED lamps as opposed to typical medium pressure mercury lamps places two significant restrictions on a UV ink formulator, firstly surface cure is more difficult to achieve, and secondly the number of photoinitiators that absorb light in the region of LED emission is very small and makes effective formulating more difficult.

When using UV LED lamps or other monochromatic UV light sources to cure inks and coatings, it is necessary to use photoinitiator systems that are tuned to the wavelength of the light source. WO 2005/111128 (Flint Ink Corporation) entitled "Ink for Excimer curing", describes photoinitiator formulations suitable for the curing of lithographic printing inks using Excimer lamps such as the "Secomatic Blue". In particular, that document discloses a lithographic ink composition, wherein said ink composition cures when exposed to an excimer light source tuned to a wavelength of 300 nm or longer. The photoinitiator combinations disclosed are principally aminoalkyl phenones, phosphine oxides and some benzophenone derivatives. A preferred embodiment includes a composition with 4-6% 4-benzoyl-4'-methyl diphenyl sulphide with 2-4% of the amino benzoate synergist ethyl-4-(dimethylamino) benzoate cured using a 308 nm light source. Similarly, WO 2009/008226 (Toyo ink manufacturing company) entitled "Ink curable with actinic energy ray and printed matter" describes an ink suitable for use with an LED curing lamp emitting in the wavelength range 350 to 420 nm. Also described is the composition containing a photo cleavage type photoinitiator such as an aminoalkyl phenone and/or a phosphine oxide photoinitiator, and a hydrogen abstraction photoinitiator which is a dialkylamino benzophenone. The formulation also optionally contains a tertiary amine compound. WO2004/056581 (Inca Digital Printer Ltd and Sericol Ltd. Curing) describes a method of curing of a UV curable inkjet ink based on a monochromatic (typically LED) light source in an inerted environment. Also described is a series of photoinitiator possibilities for curing these inkjet inks in a nitrogen inerted environment which include aminoalkyl phenones such as Irgacure 369, and a photo sensitizer such as a thioxanthone. The ink formula D in Example 2 uses the combination of 8% Irgacure 369 and 2% isopropyl thioxanthone. JP 262068752 (Seiko Epson Corporation) describes an ink composition comprising N-vinyl polymerizable compounds and a photo polymerization initiator of two or more kinds, selected from bisacylphosphine oxides, monoacylphosphine oxides and aminoalkyl phenones. JP 28280460 (Sakata Corporation) describes a cationically curable UV inkjet ink containing a cationic polymerization initiator and a sensitizer that develops a sensitizing function by light of a wavelength of around 400 nm. JP 29035650 (Sakata Corporation) describes the use of a photopolymerizable compound, 5-30 wt % of an acrylated amine compound having two photopolymerizable functional groups and two amino groups in the molecule and 5-20 wt % of a compound exhibiting initiator function by light having a wavelength of 300-450 nm. WO 2007/017644 (Sun Chemical B.V.) describes a cationic inkjet ink suitable for curing using a UV LED light source comprising an iodonium salt photoinitiator and thioxanthone sensitizer. The article "Sensitization of photoinitiators by triplets sensitizers"; K Dietliker et al. Radtech 1987 conference, Florence, page 3-37 describes in detail the potential to create curing radicals from aminoalkyl phenone type photoinitiators using light of a wavelength they do not absorb by utilizing a triplet energy transfer mechanism from a thioxanthone compound which does absorb light in the irradiated spectral region. In particular, this article describes the effect for combinations of Irgacure 369 or Irgacure 907 in combination with thioxanthone derivatives such as isopropyl thioxanthone. These "sensitizer blends" are now well known to those skilled in the art.

JP 2010-59334 (Toyo Ink Manufacturing Company Limited), published 18 Mar. 2010 and which does not constitute part of the state of the art with respect to the present invention, describes an ink curable using a UV LED light source that includes: (A) a thioxanthone; (B) an α-aminoalkyl phenone; (C) an ethylenically unsaturated monomer; and (D) a tertiary amine synergist (paragraph [0010]). Suitable tertiary amine synergists are listed in paragraph [0029] and include N,N-dimethylamino p-benzoic acid esters.

Of the materials which are available, the generally accepted view by those skilled in the art is that monoacylphosphine oxide or bisacylphosphine oxide photoinitiators are the most effective for use with UV LED light sources, with dialkylamino benzophenones (particularly N,N'-diethylamino benzophenone), thioxanthones and aminoalkyl phenones being other valuable alternatives. However, the use of high levels of phosphine oxides initiators necessitates several unwelcome health and safety labeling categories such as R43 (sensitizing) and R 50/53 damaging to the environment. In addition, dialkylamino benzophenone derivatives such as ethyl Michler's ketone are commonly used in Japan but are unacceptable from a commercial standpoint for use in Europe because of their structural association with Michler's ketone, a known human carcinogen.

Sufficiently rapid curing of inks and coating, coupled with adequate levels of cure at the surface, remains difficult to achieve with UV LED light sources. Even relatively small improvements in cure speed and/or level of surface curing make a significant difference to the commercial viability of inks and coatings that are curable using UV LED light sources. Thus, there remains a need for improved ink and coating formulations that are suitable for curing using UV LED light sources.

SUMMARY OF THE INVENTION

The present invention relates to a photoinitiator system is capable of initiating free-radical curing reactions on exposure to UV radiation from an LED light source. The photoinitiator system of the present invention is a unique photoinitiator blend that has been found to significantly improve cure speed compared with photoinitiator blends disclosed in the prior art or known to those skilled in the art.

In a first aspect, the present invention provides a photoinitiator system comprising a combination of an aminoalkyl phenone and a thioxanthone in conjunction with a multifunctional amino benzoate synergist. Such photoinitiators systems have been found to be suitable for inclusion in ink or coating formulation which are curable on exposure to radiation form a UV LED light source and other sources. It has also been found that photoinitiator system including the above components provides superior cure speeds when compared with known systems. Photoinitiator system of the first aspect of the invention is generally suitable for inclusion in an ink or coating formulation of the second aspect of the invention described below. Typically, the photoinitiator system of the first aspect of the invention is suitable for use in pigmented ink or coating formulations that are curable under air.

Although the use of aminoalkyl phenones in combination with thioxanthone is well known as an effective photoinitiator system, and has also been reported for use in LED curing in WO 20041056581 when curing under nitrogen, the use of the aminoalkyl phenone and thioxanthone combination in conjunction with an amino benzoate and particularly a multifunctional amino benzoate synergist has not previously been suggested. The use of an multifunctional amino benzoate synergist imparts a surprising and significant cure speed improvement. Whilst not wishing to be bound to any particular theory, it is suspected that the use of a multifunctional amino benzoate synergist not only functions as a particularly effective chain initiator, possibly due to the presence of multiple amino benzoate groups that are capable of forming chain-initiating radicals, but also may act as a cross-linking agent. Thioxanthone photoinitiators have been found to be effective in absorbing light in the range emitted by UV LED light sources and thus, may function as a sensitizer. Although aminoalkyl phenone photoinitiators may not be as effective at absorbing UV light emitted from UV LED light sources, their inclusion in UV photoinitiator systems has been found to be advantageous in improving the level of cure obtained. Thus, the use of an aminoalkyl phenone photoinitiator in conjunction with a thioxanthone photoinitiator/sensitizer and also a multifunctional amino benzoate synergist has been found to be a particularly advantageous combination.

According to a second aspect, the invention provides a UV-curable ink or coating formulation including the photoinitiator system of the first aspect of the invention. In one embodiment, the ink or coating formulation of the second aspect of the invention includes about 2-15% of a combination of aminoalkyl phenone and thioxanthone derivative in the weight ratio of 9.9:1 to 1:9.9; and about 1-10% of multifunctional N,N'-dimethylamino benzoate synergist, the percentages being based on the total weight of the ink or coating.

According to a third aspect of the invention there is provided a process for the preparation of a printed or coated article comprising the step of applying the ink or coating formulation of the second aspect of the invention to a substrate and curing the composition using UV radiation.

According to a fourth aspect of the invention there is provided printed or coated article comprising a cured image or layer of the ink or coating formulation of the second aspect of the invention. The printed or coated article of the fourth aspect of the invention may, for example, by prepared using the process of the third aspect of the invention.

DETAILED DESCRIPTION OF THE INVENTION

The photoinitiator system of the first aspect of the invention comprises (a) a photoinitiator combination consisting of thioxanthone and aminoalkyl phenone; and (b) multifunctional amino benzoate synergist. The photoinitiator system may also comprise further optional components such as solvent and/or reactive monomer.

The photoinitiator system of the first aspect of the invention comprises one or more thioxanthone(s). Typically, the thioxanthone functions as a sensitizer for the aminoalkyl phenone present in the photoinitiator system. Advantageously, the thioxanthone absorbs radiation at a wavelength in the range of from about 360 to about 420 nm, for example, from about 365 to about 405 nm and especially from about 380 to about 400 nm. The thioxanthone may be monomeric or polymeric. In one embodiment, thioxanthone is a compound of the formula I:

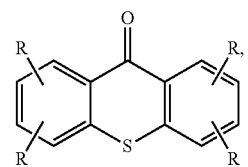

wherein each R is independently selected from hydrogen, $C_{1-12}$ alkyl, $C_{1-12}$ alkoxy or a halogen. In one embodiment, the sensitizer is 1-chloro-4-propoxythioxanthone (CPTX) or isopropyl thioxanthone (ITX), preferably ITX. ITX is a relatively inexpensive sensitizer. Other thioxanthones initiators that may be suitable for inclusion in ink or coating compositions of the invention include 2,4-diethyl thioxanthone, 2-ᵗbutyl thioxanthone, 2-chlorothioxanthone and 2-propoxy thioxanthone. Polymeric thioxanthone that may be suitable for inclusion in ink or coating compositions of the invention include Omnipol TX available from IGM Resins, Waalwijk, the Netherlands, Genopol TX-1 available from Rahn AG, Switzerland or Speedcure 7010 available from Lambson Ltd of Wetherby, UK.

Suitable aminoalkyl phenone photoinitiators for use in the invention alone or in combination include 2-benzyl-2-dimethylamino-1-(4-morpholinophenyl)butan-1-one, such as Iracure 369™ available from Ciba, and 2-methyl-1-[4-(methylthio)phenyl]-2-morpholino propan-2-one, such as Iracure 907™ available from Ciba. Preferred aminoalkyl phenones include a nitrogen atom at the para-position of the phenyl ring of the phenone group, such as the nitrogen atom in a 4-morpholinyl group. In one embodiment, the amino group of the aminoalkyl phenone is in the α-position to the ketone of the phenone, and therefore the initiator is a member of the α-aminoketone class of photoinitiators. The aminoalkyl phenone photoinitiators typically cleave to provide radicals which initiate curing processes. The presence of aminoalkyl phenone photoinitiators has been found to be advantageous in providing achieve acceptable levels of curing of ink and coating compositions, including acceptable levels of surface cure.

In one embodiment of the first or second aspect of the invention, the weight ratio of aminoalkyl phenone initiator to thioxanthone initiator/sensitizer is between about 9:1 to about 1:9. Advantageously, at least about as much thioxanthone initiator/sensitizer by weight is present as aminoalkyl phenone initiator. In a further embodiment the weight ratio of thioxanthone to aminoalkyl phenone is at least about 1:1, preferably greater than 1:1, for example about 2:1 or higher, typically about 3:1 or higher. In one embodiment, the weight ratio of thioxanthone to aminoalkyl phenone does not exceed about 10:1. Typically, the weight ratio of thioxanthone to aminoalkyl phenone is about 9:1 or less, for example about 6:1 or less. Typically, the photoinitiator composition has a weight ratio of thioxanthone to aminoalkyl phenone in the range of from about 1:1 to about 9:1, for example from about 2:1 to about 7:1.

The multifunctional amino benzoate synergist is a compound including two or more amino benzoate groups. Typically the amino benzoate groups are attached to a polymeric polyether. A polymeric polyether is a compound that includes a core from which two or more polyether chains extend. The core is typically a group derived from a polyol compound having multiple hydroxyl functional groups, such as a group derived from pentaerythritol (2,2-bis(hydroxymethyl)1,3-propanediol), ethylene glycol (ethane-1,2-diol), propylene glycol (propane-1,2-diol), glycerol (propan-1,2,3-triol) or erythritol (butane-1,2,3,4-tetraol). Alternatively the core of the polymeric polyol from which the polyether chains extend may be an amine, typically an aliphatic di- or higher-functional amine containing two or more amine groups, such as ethane 1,2-diamine. Examples of polyether chains include polyethylene glycol, polypropylene glycol and poly(tetramethylene ether)glycol chains, with polyethylene glycol and polypropylene glycol chains being preferred. The amino benzoate groups are attached to the polyether chains via an ester linkage, between an oxygen atom of the polyether chain and the carbonyl group of the benzoate. The polymeric chains are typically built out from the core by reacting epoxides like ethylene oxide or propylene oxide with a multifunctional polyol or amine initiator in the presence of a catalyst, often a strong base such as potassium hydroxide or a double metal cyanide catalyst such as zinc hexacyanocobaltate-t-butanol complex. In reality, the chains are unlikely be of equal length in any one molecule and there would be a distribution of molecular weight polyols within the material. The amino groups of the amino benzoate synergists are typically tertiary amino groups, one substituent being the phenyl group and the other two substituents being other than hydrogen such as aliphatic groups. In one embodiment, the amino benzoate groups of the synergist compound are diC$_{1-4}$alkylamino benzoate groups. The amino benzoate groups of the synergist compound are typically para-(N,N'-diC$_{1-4}$alkylamino) benzoate groups, for example, para-(N,N'-dimethylamino) benzoate groups. In one embodiment, the initiator system of the invention comprises at least one tri- or higher-functional amino benzoate synergist, for example at least one tetrafunctional amino benzoate synergist. The photoinitiator system of the invention may include a mixture of two or more different multifunctional amino benzoate compounds. Suitable multifunctional amino benzoate synergists include 1,3-di({α-4-(dimethylamino)benzoylpoly[oxy(1-methylethylene)]}oxy)-2,2-bis({α-4-(dimethylamino)benzoylpoly[oxy(1-methylethylene)]}oxymethyl) propane and {α-4-(dimethylamino)benzoylpoly(oxyethylene)-poly[oxy(1-methylethylene)]-poly(oxyethylene)}4-(dimethylamino) benzoate. Speedcure 7040 available from Lambson includes a mixture of the two multifunctional amino benzoate synergists mentioned immediately above and has been found to be suitable for use in the invention. Other suitable multifunctional amino benzoate synergists include Genopol™ AB-1 available from Rahn and poly(ethylene glycol)bis(p-dimethylamino benzoate) such as Omnipol™ ASA available from IGM. Suitable multifunctional amino benzoate synergists comprising multiple amino benzoate groups linked to an aliphatic amine core include examples COINI-07 and COINI-08 described in EP 1 925 609 A1 (Agfa Graphics N.V.) and compounds of the Formula I described in WO 2007/017298 A1 (Lamberti SPA). The presence of the multifunctional amino benzoate synergist in the photoinitiator compositions of the invention has been found to be advantageous in providing rapid curing of ink and coating compositions.

Typically, the photoinitiator composition has a weight ratio of thioxanthone to multifunctional amino benzoate in the range of from about 1:2 to about 5:1, for example from about 1:1 to about 4:1, especially from about 1:1 to about 2:1. Typically, the photoinitiator composition has a weight ratio of aminoalkyl phenone to multifunctional amino benzoate synergist in the range of from about 2:1 to about 1:5, for example from about 1:1 to about 1:4, especially from about 1:2 to about 1:3. The multifunctional amino benzoate synergist is generally present in an amount, based on the total weight of the synergist/aminoalkyl phenone/thioxanthone combination, of about 1 to about 81 wt %, preferably about 5 to about 31 wt %.

In one embodiment of the first aspect of the invention, there is provided a photoinitiator system comprising a photoinitiator combination consisting of aminoalkyl phenone and thioxanthone derivative in the ratio of between about 9:1 to about 1:9, coupled with a multifunctional N,N'-dimethyl amino benzoate synergist. Such photoinitiator systems are typically suitable for use pigmented and non-pigmented inks and coatings, preferably lithographic and flexographic printing inks and coatings. Advantageous the inks and coating comprising such photoinitiator systems are suitable for curing under air. Typically, the inks and coatings of the invention include the photoinitiator combination at a level of between about 2-15 wt %, preferably between about 5-10 wt %. Typically, the inks and coatings of the invention include the multifunctional amino benzoate synergist at a level of from about 1 to about 10 wt %, preferably from about 3 to about 8 wt %. In a further embodiment, the present invention provides a photoinitiator system suitable for curing under air of pigmented and non-pigmented inks and coatings, preferably lithographic and flexographic printing inks and coatings containing or consisting of aminoalkyl phenone and thioxanthone derivative in the ratio of between 9:1 to 1:9 and a level of between 2-15%, preferably between 5-10%, coupled with multifunctional N,N'-dimethyl amino benzoate synergist at a level between 1-10%, preferably between 3-8%.

Typically, the ink or coating composition includes at least about 2 wt %, especially at least about 3 wt %, for example at least about 5 wt % thioxanthone. Typically, the thioxanthone constitutes no more than about 13 wt %, for example no more than about 10 wt % of the ink or coating formulation of the second aspect of the invention based on the total weight of the formulation. Levels of thioxanthone of at least about 3 wt % are desirable in the ink and coating formulations of the invention in order to ensure sufficiently rapid cure with levels thioxanthone of from about 3 wt % to about 9 wt % being found to be particularly advantageous.

Typically, the ink or coating composition includes at least about 0.5 wt %, especially at least about 1 wt %, for example at least about 1.5 wt % aminoalkyl phenone. Typically, the aminoalkyl phenone constitutes no more than about 6 wt %, for example no more than about 5 wt %, especially no more than about 4 wt % of the ink or coating formulation of the second aspect of the invention based on the total weight of the formulation. Advantageously, the aminoalkyl phenone constitutes less than 2.50 wt %, for example no more than 2.49 wt %, especially no more than about 2.4 wt % of the formulation based on the total weight of the formulation. Inks and coatings comprising levels of aminoalkyl phenone of 2.5 wt % or above are undesirable as they may require special labelling and/or packaging.

The photoinitiator combination typically constitutes at least about 5% by weight (wt %), for example at least about 7 wt %, and especially at least about 8 wt %, of the ink or coating formulation of the second aspect of the invention based on the total weight of the formulation. Typically, the photoinitiator combination constitutes no more than about 18 wt %, for example no more than about 15 wt % and especially no more than about 12 wt % of the ink or coating formulation based on the total weight of the formulation.

The multifunctional amino benzoate synergist typically constitutes at least about 0.2 wt %, for example at least about 0.5 wt %, and especially at least about 1 wt % of the ink or coating formulation of the second aspect of the invention based on the total weight of the formulation. Typically, the multifunctional amino benzoate synergist constitutes no more than about 8 wt %, for example no more than about 7 wt % and especially no more than about 6 wt % of the ink or coating formulation based on the total weight of the formulation. In one embodiment, the multifunctional amino benzoate synergist constitutes no more than about 5 wt %, for example no more than about 4 wt %, of the ink or coating formulation based on the total weight of the formulation.

The photoinitiator system typically constitutes at least about 5 wt %, for example at least about 8 wt %, and especially at least about 10 wt % of the ink or coating formulation of the second aspect of the invention based on the total weight of the formulation. Typically, the photoinitiator system constitutes no more than about 18 wt %, preferably no more than about 15 wt %, for example no more than about 13 wt %, and especially no more than about 10 wt %, of the ink or coating formulation based on the total weight of the formulation.

In one embodiment of the second aspect of the invention, there is provided a UV curable ink or coating including about 2-15% of a combination of an aminoalkyl phenone and a thioxanthone derivative in the ratio of about 9.9:1 to about 1:9.9; and about 1-10% of a multifunctional N,N'-dimethylamino benzoate synergist, the percentages being based on the total weight of the ink or coating In a further embodiment, there is provided an ink or coating which is a pigmented UV-curable lithographic or flexographic printing ink containing a photoinitiator combination in which the aminoalkyl phenone and thioxanthone derivative are in the weight ratio of between about 9.9:1 to about 1:9.9 and a level of between about 2 and about 15 wt %, combined with multifunctional N,N'-dimethylamino benzoate synergist at a level between about 1 and about 10 wt %, the percentages being based on the total weight of the ink or coating. Advantageously, the ink or coating is suitable for curing in air. Advantageously, the ink or coating is suitable for curing using an LED light source. In a yet further embodiment, there is provided a pigmented UV curable lithographic or flexographic printing ink containing a photoinitiator combination suitable for curing using a LED light source in air, consisting of an aminoalkyl phenone and a thioxanthone derivative in the ratio of between 9.9:1 to 1:9.9 and a level of between 2-15%, preferably between 5-10%, combined with a multifunctional N,N'-dimethyl amino benzoate synergist at a level between 1-10%, preferably between 3-8%.

The ink or coating formulation of the second aspect of the invention is cures in a free radical curing mechanism. In addition to the photoinitiator system of the first aspect of the invention, the formulation typically includes an ethylenically unsaturated monomer or oligomer or other monomer or oligomer that is capable of curing in a free radical curing reaction. The term "oligomer" as used herein refers to prepolymer component having a molecular weight of the order of about 500 to about 3000 and/or small number of repeating monomer units such as, for example, dimers, trimers and tetramers. Suitable free radical-curable monomers and oligomers include (meth)acrylate monomers and oligomers, i.e. acrylate monomers and oligomers, methacrylate monomer and oligomers and mixtures thereof. Advantageously, the inks and coatings of the invention comprise at least one multifunctional (meth)acrylate monomer, for example one or more di- or higher-functional (meth)acrylate monomer, especially one or more tri- or higher functional (meth)acrylate monomer. Suitable free radically curable oligomers include polyester (meth)acrylate oligomers. Multifunctional polyester (meth) acrylate oligomers comprising more than one (meth)acrylate group are especially suitable.

The ink and coating formulations of the second aspect of the invention typically include a colorant such as a pigment or dye, for example a pigment. Preferably the colorant is other than a white colorant. The photoinitiator composition of the first aspect of the invention is particularly suited for use with coloured, for example pigmented, inks and coating. It has been found that acceptable levels of curing of pigmented inks and coatings can advantageously be obtained when the photoinitiator system of the present invention is included in the formulation. In one embodiment, the ink and coating formulations of the second aspect of the invention include at least about 5 wt %, for example at least about 10 wt %, of a colorant based on the total weight of the formulation. In a further embodiment, the ink and coating formulations of the second aspect of the invention include no more than about 30 wt %, for example no more than about 25 wt %, of a colorant based on the total weight of the formulation. Flexographic inks and coatings of the invention typically include from about 12 wt % to about 28 wt %, for example about 15 wt %, pigment. Offset inks of the invention typically include from about 15 wt % to about 25 wt %, for example from about 18 wt % to about 22 wt %, pigment. The colorants are typically blended into the ink and coating formulations as a colorant concentration that comprises solvents and/or monomers in addition to the pigment or other colorant.

Due to the need to prevent yellowing of inks and coatings upon cure, the most suitable photoinitiators for use in colourless coatings and white inks are typically mono or bis acyl phosphine oxides. It has been demonstrated here that the inventive photoinitiator blend is efficient for curing UV inks, especially pigmented UV inks, and also pigmented UV coatings, where the phosphine oxides have traditionally been used.

Additives which may be used in conjunction with the principal components of the ink and coating formulations of the present invention include stabilizers, plasticizers, waxes, slip aids, levelling aids, adhesion promoters, surfactants and fillers. The formulations of the second aspect of the present invention typically comprise, as additional components to those referred to above, one or more of waxes, stabilizers, and flow aids, for example as described in "The Printing Ink Manual", 5$^{th}$ Edition, edited by R. H. Leach et al., published in 1993 by Blueprint.

In one embodiment of the third aspect of the invention, the ink is applied using a flexographic (flexo) or lithographic printing process. In a further embodiment the ink is applied using a flexo, offset, gravure or inkjet printing process, for example a flexo, offset or inkjet process, especially a flexo or offset process. The ink of the first aspect of the invention is advantageously suitable for use in such printing processes In one embodiment of the third aspect of the invention, the ink or coating is cured using an LED UV-radiation source.

In one embodiment of the third aspect of the invention, the ink or coating is cured in air. In a further embodiment of the third aspect of the invention, an inert environment, such as a nitrogen or argon blanket, is not provided in the region of the UV radiation source. Ink and coating compositions according to the second aspect of the invention may be cured in the presence of oxygen obviating the need for an inert oxygen-free environment to be provided to prevent oxygen inhibition during curing.

It is to be understood that any feature described above with respect to any particular aspect or embodiment of the invention may, if appropriate, also be present in any of the other aspects or embodiments of the invention.

EXAMPLES

The following examples illustrate specific aspects of the present invention and are not intended to limit the scope thereof in any respect and should not be so construed.

Example 1

Black UV flexo ink formulations were prepared based on the following composition:

| Material | wt % |
| --- | --- |
| Black 7 pigment concentrate (SunChemical) | 35.0 |
| Blue 15:3 pigment concentrate (SunChemical) | 3.2 |
| Resistant violet 23 pigment concentrate (SunChemical) | 4.2 |
| Florstab UV1 stabilizer (Kromachem) | 1.5 |
| Radwax 65 wax dispersion (Kromachem) | 1.7 |
| Dynoadd F1 flow additive (Dynea) | 0.5 |
| Ebecryl 846 oligomer (Cytec) | 6.0 |
| Total | 52.1 |

Individual photoinitiator additives were included at levels as described below and the remainder of the formulation was made up to 100 parts using 22.9% of the acrylate monomer trimethylolpropane triacrylate (TMPTA, for example, SR351 from Sartomer) and 10% of the acrylate monomer hexane diol diacrylate (HDDA, for example, SR236 from Sartomer).

| Formulation | Sensitizer | Photoinitiator | Amine synergist | Maximum cure speed (m/min) |
| --- | --- | --- | --- | --- |
| A1 (comparative) | 8% Omnirad ITX[1] | 2% Irgacure 369[2] | 5% Omnirad EHA[3] | 70 |
| B1 | 8% Omnirad ITX | 2% Irgacure 369 | 5% Omnipol ASA[4] | >99 |
| C1 | 8% Omnirad ITX | 2% Irgacure 369 | 5% Genopol AB1[5] | >99 |
| D1 | 8% Omnirad ITX | 2% Irgacure 369 | 5% Speedcure 7040[6] | >99 |
| E1 (comparative) | 8% Omnirad ITX | 2% Irgacure 907[7] | 5% Omnirad EHA | 50 |
| F1 | 8% Omnirad ITX | 2% Irgacure 907 | 5% Genopol AB1 | >99 |

[1] isopropyl thioxanthone (IGM)
[2] 2-benzyl-2-dimethylamino-1-(4-morpholinophenyl)butan-1-one (Ciba)
[3] N,N-dimethyl-4-aminobenzoic acid 2-ethylhexyl ester (IGM)
[4] Poly(ethylene glycol) bis (p-dimethylamino benzoate) (IGM)
[5] multifunctional amino benzoate (Rahn)
[6] mixed multifunctional amino benzoates (Lambson)
[7] 2-methyl-1-[4-(methylthio)phenyl]-2-morpholino propan-2-one (Ciba)

The inks were printed onto an impervious metalized carton board substrate using a Flexiproof 100 flexographic proofer from RK fitted with a dual anilox of 200 lines/cm (5 cm$^3$/m$^2$) & 400 lines/cm (3 cm$^3$/m$^2$), and an in-line Phoseon Fireflex UV LED lamp. The Flexiproof 100 has variable print/cure speeds between 15 and 99 m/minute.

The irradiated inks were tested for cure using a "set-off cure test" by comparing the extent to which ink is transferred to a piece of blank carton board substrate when placed reverse side down on the cured ink under 10 tons of pressure for 5 seconds. When the ink is fully cured there is no substantial transfer of colour to the blank substrate, but when the ink is not fully cured a significant amount of colour is transferred. Maximum cure speed is defined in these experiments where there is no substantial discoloration of the blank substrate.

These cure speed results demonstrate that the formulations containing the multifunctional amino benzoate derivatives (formulations B1, C1, D1 and F1) cure significantly faster than equivalent comparative formulations (A1 and E1) containing the monofunctional amino benzoate derivative Omnirad EHA. This significant improvement in performance is despite the fact that Omnirad EHA is the material with the lowest molecular weight, and on this basis the multifunctional amino benzoate derivatives would not be the logical formulating choice to those skilled in the art.

The results also demonstrate that the photoinitiator Irgacure 369 (formulation A) has a significantly better performance than Irgacure 907 (formulation E), as is well known by those skilled in the art.

Example 2 (Comparative)

Black UV flexo ink formulations were prepared based on the composition as described in Example 1 except that the HDDA monomer was replaced by TMPTA. The photoinitiator composition was as described below. The performance of the formulations was tested as described in Example 1.

| Formulation (Comparative) | Omnirad EHA (synergist) | Omnirad ITX (senstiser) | Irgacure 907 (initiator) | maximum cure speed (m/min) |
|---|---|---|---|---|
| A2 | 5% | 10% | 0% | 40 |
| B2 | 5% | 8% | 2% | 60 |
| C2 | 5% | 6% | 4% | 40 |
| D2 | 5% | 4% | 6% | 40 |
| E2 | 5% | 2% | 8% | 30 |

These results demonstrate that the formulations containing a level of about 2% of aminoalkyl phenone photoinitiator such as Irgacure 907 (formulation B2) gives an increase in performance relative to a formulation that contains no aminoalkyl phenone (formulation A1). It can also be seen that higher levels of aminoalkyl phenone are not beneficial to the performance as these photoinitiators do not absorb light from the LED lamp but rely on a triplet energy transfer from the ITX which does absorb the LED light. At the highest level of Irgacure 907 and the lowest level of ITX (formulation E2) it can be seen that the cure speed is lower because there is not sufficient ITX present to absorb the LED light emission adequately.

Example 3

Black UV flexo ink formulations were prepared based on the following composition:

| Material | % |
|---|---|
| Black 7 pigment concentrate (SunChemical) | 35.0 |
| Blue 15:3 pigment concentrate (SunChemical) | 3.2 |
| Resistant violet 23 pigment concentrate (SunChemical) | 4.2 |
| Florstab UV1 stabilizer (Kromachem) | 1.5 |
| Radwax 65 wax dispersion (Kromachem) | 1.7 |
| Dynoadd F1 flow additive (Dynea) | 0.5 |
| Ebecryl 846 oligomer[1] (Cytec) | 6.0 |
| Total | 52.1 |

[1]Ebecryl™ 846 is modified tetra-functional acrylate polyester oligomer available from Cytec Surface Specialities Inc, Smyra, GA, USA.

The photoinitiator composition was as described below, with the formulation made up to 100 parts using the monomer TMPTA. The performance of the formulations was tested as described in Example 1.

| Formulation | Omnirad ITX (senstiser) | Irgacure 369 (initiator) | Genopol AB1 (synergist) | maximum cure speed (m/min) |
|---|---|---|---|---|
| A3 (comparative) | 4.5% | 3% | 0% | <15 |
| B3 | 4.5% | 3% | 1% | 20 |
| C3 | 4.5% | 3% | 2% | 30 |
| D3 | 4.5% | 3% | 3% | 40 |
| E3 | 4.5% | 3% | 4% | 50 |
| F3 | 4.5% | 3% | 5% | 60 |

These results demonstrate that formulations containing an aminoalkyl phenone and a thioxanthone derivative (as described in WO 2004/056581—specifically the ink formula D in the Example 2 of that document using a combination of 8% Irgacure 369 and 2% isopropyl thioxanthone) is not suited to curing of inks and coatings in the presence of an air environment. This is demonstrated in the results here by the fact that formulation A3 has a maximum cure speed of below 15 m/min in the absence of an amine synergist, but improves substantially when a multifunctional amino benzoate synergist is present.

Example 4

Black UV flexo ink formulations were prepared based on the following composition:

| Material | % |
|---|---|
| Black 7 pigment concentrate (SunChemical) | 35.0 |
| Blue 15:3 pigment concentrate (SunChemical) | 3.2 |
| Resistant violet 23 pigment concentrate (SunChemical) | 4.2 |
| Florstab UV1 stabilizer (Kromachem) | 1.5 |
| Radwax 65 wax dispersion (Kromachem) | 1.7 |
| Dynoadd F1 flow additive (Dynea) | 0.5 |
| Ebecryl 846 oligomer (Cytec) | 6.0 |
| HDDA, SR236 (Sartomer) | 10.0 |
| Total | 62.1 |

The photoinitiator composition was as described below, with the formulation made up to 100 parts using the monomer TMPTA. The performance of the formulations was tested as described in Example 1. The performance of the formulations was tested as described in Example 1.

| Formulation | Omnipol ASA (synergist) | Irgacure 369 (initiator) | Omnirad ITX (sensitiser) | maximum cure speed (m/min) |
|---|---|---|---|---|
| A4 | 5% | 4% | 6% | 70 |
| B4 | 6% | 4% | 6% | 70 |
| C4 | 7% | 4% | 6% | 70 |
| D4 | 8% | 4% | 6% | 70 |

When interpreted alongside the results shown in Example 3, these results demonstrate that there is little or no benefit in using levels of the multifunctional amino benzoates synergists higher than about 5% in the formulation.

Example 5

Yellow, magenta and cyan UV flexo ink formulations were prepared based on the following composition;

| Material | Yellow ink | Magenta ink | Cyan ink |
|---|---|---|---|
| Yellow 13 pigment concentrate (SunChemical) | 50.0 | — | — |
| Magenta 57:1 pigment concentrate (SunChemical) | — | 45.0 | — |
| Blue 15:3 pigment concentrate (SunChemical) | — | — | 42.5 |
| Florstab UV1 stabilizer (Kromachem) | — | 0.5 | 1.5 |
| Radwax 65 wax dispersion (Kromachem) | 1.7 | 1.7 | 1.7 |
| Dynoadd F1 flow additive (Dynea) | 0.5 | 0.5 | 0.5 |
| Ebecryl 846 oligomer (Cytec) | 5.1 | — | 9.2 |
| TMPTA monomer SR351 (Sartomer) | 22.7 | 32.3 | 24.6 |
| HDDA monomer SR236 (Sartomer) | 5.0 | 5.0 | 5.0 |
| Genopol AB1 amino benzoate synergst (Rahn) | 5.0 | 5.0 | 5.0 |
| Omnirad ITX photoinitiator (IGM) | 8.0 | 8.0 | 8.0 |
| Irgacure 369 photoinitiator (Ciba) | 2.0 | 2.0 | 2.0 |
| Total | 100.0 | 100.0 | 100.0 |

The inks were printed onto Avery Denison "PE85 Top Trans Label Stock" using a Flexiproof 100 flexo graphic proofer from RK fitted with a dual anilox of 200 lines/cm (5 $cm^3/m^2$) & 400 lines/cm (3 $cm^3/m^2$)), and an in-line Phoseon Fireflex UV LED lamp. The inks were cured with a single pass at 99 m/minute and all determined to be tack-free and fully cured as defined by the well known "thumb-twist test". This demonstrates that the photoinitator composition that is the subject of this invention is also useful for making flexography printing inks of other colours as well as black that cure rapidly using a UV LED light source.

The standard thumb twist test to confirm adequate cure, is where a thumb is firmly applied to the cured film and twisted. Any deformation of the film or tackiness of the film or transfer of the film to the thumb is classified as a failure. Such a test is well known in the art and is, for example, described on page 74 of *Test Methods for UV and EB Curable Systems*, C. Lowe & P.K.T Oldring, SITA Technology, 1994, ISBN 0 947798 07 2. The print is considered to be fully cured when the print is dry and no thumb print or surface marking is left after the test.

Example 6

Yellow, magenta, cyan & black offset inks were prepared based on the following formulations:

| Material | Yellow | Magenta | Cyan | Black |
|---|---|---|---|---|
| OTA480 acrylate monomer (Cytec) | 12.5 | 12.5 | 5.8 | 9 |
| Genorad 18 stabilizer (Kromachem) | 1 | — | — | — |
| Micro Talc IT extra (Norwegian Talc) | 3.0 | 3.0 | 3.0 | 3.0 |
| Photomer 3016 Oligomer (Cognis) | 0.9 | 0.9 | 0.9 | 0.9 |
| Ebecryl 350 silicone acrylate (Cytec) | 0.1 | 0.1 | 0.1 | 0.1 |
| Ebecryl 846 Oligomer (Cytec) | 18.0 | 18.0 | 17.3 | 14.0 |
| Laromer LR 9004 oligomer (BASF) | 33.9 | 30.0 | 38.8 | 39.6 |
| Advantage UAV21 orange toning ink (SunChemical) | 0.6 | — | — | — |
| Sunbrite yellow 13 pigment (SunChemical) | 15.0 | — | — | — |
| Florstab UV 1 (Kromachem) | — | 1.0 | 1.0 | 1.0 |
| Symuler brilliant Carmine B010 magenta pigment (DIC) | — | 19.5 | — | — |
| Sunfast blue 15:3 cyan pigment (SunChemical) | — | — | 18.1 | 1.2 |
| Solsperse 39,000 dispersant (Lubrizol) | — | — | — | 1.0 |
| Raven 1060 black pigment (Columbian Chemicals) | — | — | — | 7.2 |
| Raven 1100 black pigment (Columbian Chemicals) | — | — | — | 7.2 |
| Fastogen Super-Violet RNS pigment (DIC) | — | — | — | 0.8 |
| Omnirad ITX - initiator/sensitizer | 8.0 | 8.0 | 8.0 | 8.0 |
| Irgacure 369 - initiator | 2.0 | 2.0 | 2.0 | 2.0 |
| Genopol AB1 - synergist | 5.0 | 5.0 | 5.0 | 5.0 |
| Total | 100.0 | 100.0 | 100.0 | 100.0 |

The inks were printed onto in Incada Excel cartonboard substrate using an IGT C1 proofer to densities of 1.15 (yellow), 1.63 (magenta), 1.86 (cyan), 1.89 (black), and cured using a Phoseon Fireflex UV LED lamp at a speed of 99 m/min. The irradiated inks were tested for cure using a "set-off cure test" as previously defined. The magenta, cyan and black inks all cured with a single pass under the lamp, but the yellow ink required 2 passes to be fully cured. This demonstrates that the photoinitator composition that is the subject of this invention is also useful for making yellow, magenta, cyan & black lithographic printing inks that cure rapidly using a UV LED light source.

Example 7 (Comparative)

Black UV flexo ink formulations were prepared as described below. The performance of the formulations was tested as described in Example 1.

| | Formulation (Comparative) | | | |
|---|---|---|---|---|
| Material | A7 | B7 | C7 | D7 |
| Black 7 pigment concentrate (SunChemical) | 35.0 | 35.0 | 35.0 | 35.0 |
| Blue 15:3 pigment concentrate (SunChemical) | 3.2 | 3.2 | 3.2 | 3.2 |
| Resistant violet 23 pigment concentrate (SunChemical) | 4.2 | 4.2 | 4.2 | 4.2 |
| Florstab UV1 stabilizer (Kromachem) | 1.5 | 1.5 | 1.5 | 1.5 |
| Radwax 65 wax dispersion (Kromachem) | 1.7 | 1.7 | 1.7 | 1.7 |
| Dynoadd F1 flow additive (Dynea) | 0.5 | 0.5 | 0.5 | 0.5 |
| Ebecryl 846 oligomer (Cytec) | 6.0 | 6.0 | 6.0 | 6.0 |
| HDDA, SR236 (Sartomer) | 10.0 | 10.0 | 10.0 | 10.0 |
| TMPTA, SR351 (Sartomer) | 30.9 | 30.9 | 30.9 | 26.9 |
| Omnirad EHA | — | — | — | 5.0 |
| Omnirad TPO[8] | 7.0 | — | — | 6.0 |
| Lucerin TPO-XL[9] | — | 7.0 | — | — |
| Irgacure 819[10] | — | — | 7.0 | — |
| Total | 100 | 100 | 100 | 100 |

[8] 2,4,6-trimethylbenzoyl diphenylphosphine oxide ex IGM
[9] Mixture of 2,4,6-trimethylbenzoyl diphenylphosphinic acid ethyl ester and bis(2,4,6-trimethylbenzoyl)phenyl phosphine oxide ex BASF
[10] Bis(2,4,6-trimethylbenzoyl)phenyl phosphine oxide ex CIBA

| Formulation (Comparative) | maximum cure speed (m/min) |
|---|---|
| A7 | <20 |
| B7 | <20 |
| C7 | <20 |
| D | <15 |

These results indicate that none of the acyl phosphine oxide photoinitiators tested showed acceptable cure speed with or without the presence of an amine synergist. It is accepted that this class of photoinitiator is of use in white inks and coatings where there is little competitive light absorption in the region where the photoinitiator absorbs light and the UV LED emits light. The photoinitiators tested were similar to those described in JP 262068752 & WO 2009/008226. In contrast to the photoinitiator system of the present invention, this class of photoinitiator do not perform well in a black pigmented ink where there is significant competitive light absorption.

Example 8 (Comparative)

The electron/proton transfer sensitization effect of a mixture of benzophenone and dialkylamino benzophenone (such as ethyl Michler's ketone) is well known to those skilled in the art and the use of ethyl Michler's ketone is taught in WO 2009008226. The effectiveness of mixtures of ethyl Michler's ketone, Genopol AB 1 amino benzoate synergist and benzophenone was defined using a broad range of photoinitiator combinations in a black. UV ink formulations as defined below:

| Material | % |
| --- | --- |
| Black 7 pigment concentrate (SunChemical) | 35.0 |
| Blue 15:3 pigment concentrate (SunChemical) | 3.2 |
| Resistant violet 23 pigment concentrate (SunChemical) | 4.2 |
| Florstab UV1 stabilizer (Kromachem) | 1.5 |
| Radwax 65 wax dispersion (Kromachem) | 1.7 |
| Dynoadd F1 flow additive (Dynea) | 0.5 |
| Ebecryl 846 oligomer (Cytec) | 6.0 |
| Total | 52.1 |

Individual photoinitiator additives were included at levels as described below and the remainder of the formulation was made up to 100 parts using 22.9% of the acrylate monomer trimethylolpropane triacrylate (TMPTA), and 10% of the acrylate monomer hexane diol diacrylate (HDDA). The performance of the formulations was tested as described in Example 1.

| Formulation (Comparative) | Benzophenone level/% | Genopol AB1 level/% | Ethyl Michler's ketone level/% | maximum cure speed (m/min) |
| --- | --- | --- | --- | --- |
| A8 | 9.500 | 0.000 | 5.50 | <15 |
| B8 | 6.125 | 1.625 | 7.25 | 25 |
| C8 | 9.625 | 1.625 | 3.75 | <15 |
| D8 | 6.250 | 3.250 | 5.50 | 15 |
| E8 | 4.500 | 1.500 | 9.00 | 30 |
| F8 | 3.000 | 6.500 | 5.50 | 15 |
| G8 | 13.000 | 0.000 | 2.00 | <15 |
| H8 | 3.000 | 10.000 | 2.00 | <15 |
| I8 | 3.000 | 3.000 | 9.00 | 30 |
| J8 | 6.000 | 0.000 | 9.00 | 25 |
| K8 | 8.000 | 5.000 | 2.00 | <15 |
| L8 | 4.625 | 6.625 | 3.75 | <15 |
| M8 | 4.625 | 3.125 | 7.25 | 20 |

The most reactive combination was formulation 18, containing 3% benzophenone, 3% Genopol AB1 and 9% ethyl Michler's ketone with a cure speed of 30 m/min However, this cure speed is substantially slower than the formulations of the invention.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. A photoinitiator system comprising an aminoalkyl phenone, a thioxanthone and a multifunctional amino benzoate synergist, wherein a weight ratio of the thioxanthone to the aminoalkyl phenone is greater than 1:1.

2. The photoinitiator system of claim 1, wherein the multifunctional amino benzoate synergist comprises two or more $diC_{1-4}$alkylamino benzoate groups.

3. The photoinitiator system of claim 2, wherein the multifunctional amino benzoate synergist comprises two or more para-(N,N'-dimethylamino) benzoate groups.

4. The photoinitiator system of claim 1 wherein the weight ratio of the thioxanthone to the aminoalkyl phenone ranges from 2:1 to 7:1.

5. A UV-curable ink or coating comprising a photoinitiator system, said photoinitiator comprises an aminoalkyl phenone, a thioxanthone and a multifunctional amino benzoate synergist, wherein a weight ratio of the thioxanthone to the aminoalkyl phenone is greater than 1:1; and wherein the thioxanthone and the aminoalkyl phenone together constitute from 5 wt % to 15 wt % of the total weight of the UV-curable ink or coating.

6. The UV-curable ink or coating of claim 5, further comprising a colorant.

7. The UV-curable ink or coating of claim 1, wherein the multifunctional amino benzoate synergist constitutes from 1 wt % to 8 wt % of the total weight of the UV-curable ink or coating.

8. The UV-curable ink or coating of claim 5, further comprising an ethylenically unsaturated monomer.

9. The UV-curable ink or coating of claim 5, wherein the weight ratio of the thioxanthone to the aminoalkyl phenone ranges from 2:1 to 7:1.

10. A process for preparing a printed or coated article comprising:
 applying a UV-curable ink or coating to said article, said ink or coating having a photoinitiator system comprising an aminoalkyl phenone, a thioxanthone and a multifunctional amino benzoate synergist, wherein a weight ratio of the thioxanthone to the aminoalkyl phenone is greater than 1:1; and
 curing the UV-curable ink or coating composition using UV radiation.

11. The process of claim 10, wherein the UV-curable ink or coating is applied by a lithographic or flexographic printing technique.

12. The process of claim 10, wherein the UV radiation is applied from an LED light source.

13. A printed or coated article comprising a cured image or layer of the UV-curable ink or coating of claim 5.

14. The UV-curable ink or coating of claim 5, wherein the multifunctional amino benzoate synergist comprises two or more $diC_{1-4}$alkylamino benzoate groups.

15. The UV-curable ink or coating of claim 14, wherein the multifunctional amino benzoate synergist comprises two or more para-(N,N'-dimethylamino) benzoate groups.

* * * * *